United States Patent
Melia

[15] 3,699,237
[45] Oct. 17, 1972

[54] BUOYANT ELECTRIC CABLE
[72] Inventor: Thomas J. Melia, Sutton, Mass.
[73] Assignee: United States Steel Corporation
[22] Filed: Feb. 10, 1971
[21] Appl. No.: 114,274

[52] U.S. Cl............174/101.5, 174/11 R, 174/110 F, 174/113 R, 174/115, 340/13 R
[51] Int. Cl................................H01b 7/12
[58] Field of Search......174/113 R, 101.5, 115, 11 R, 174/47, 70 R; 340/13 R, 7 R

[56] References Cited

UNITED STATES PATENTS

| | | |
|---|---|---|
| 2,948,020 | 9/1960 | D'Ascoli..............174/113 R |
| 3,526,086 | 9/1970 | Morgan..................174/47 X |
| 3,531,760 | 9/1970 | Whitfill.....................340/7 R |

FOREIGN PATENTS OR APPLICATIONS 1,929,967  12/1970  Germany..................174/115

Primary Examiner—E. A. Goldberg
Attorney—Martin J. Carroll

[57] ABSTRACT

A buoyant electric cable has a core member such as a pipe for supporting a plurality of elements which are stranded around the core member. Some of said elements are electric conductors and the other elements are tubes which are adapted to receive a fluid for changing the buoyancy of the cable. An eccentric foamed jacket surrounds the stranded elements with a sensing element embedded in the thickest part of the jacket. A protective jacket is preferably provided over the outside of the foamed jacket.

12 Claims, 1 Drawing Figure

PATENTED OCT 17 1972
3,699,237
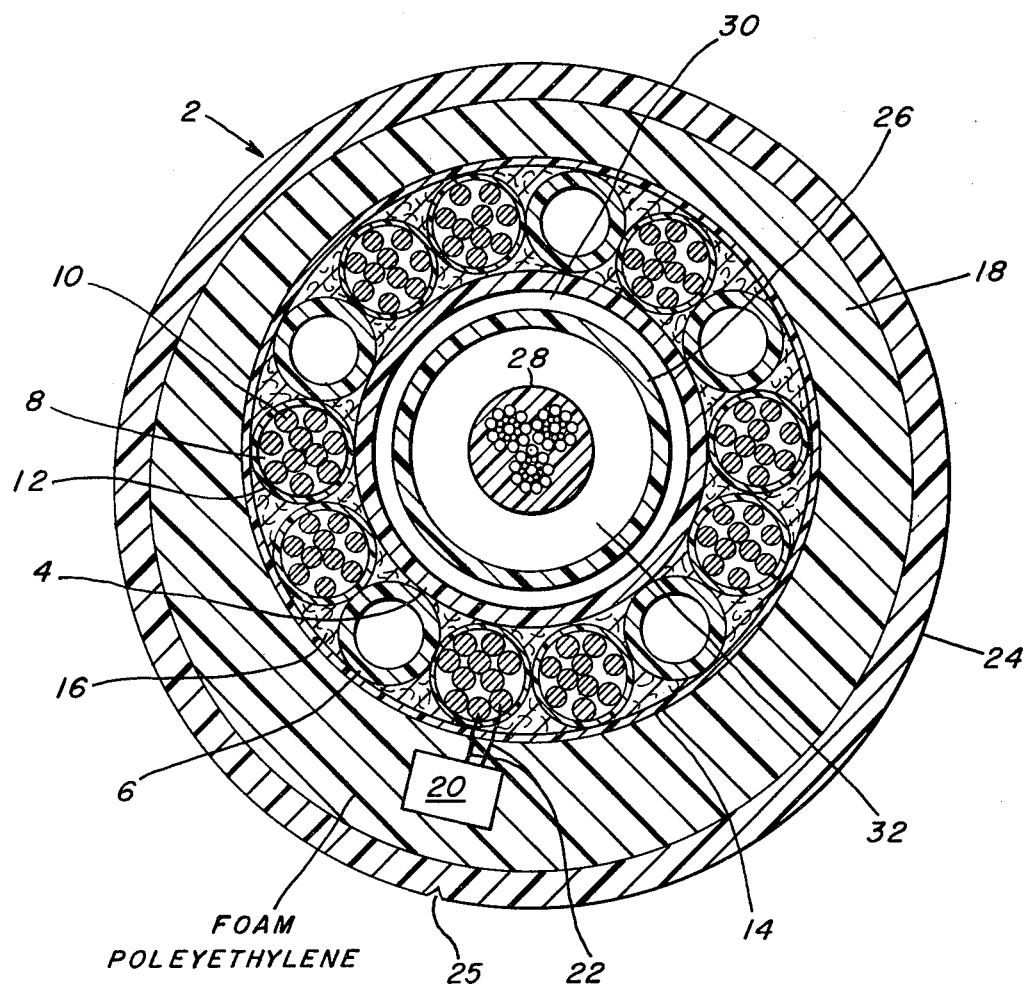
FOAM
POLEYETHYLENE
INVENTOR.
THOMAS J. MELIA
By Martin J. Carroll
Attorney

BUOYANT ELECTRIC CABLE

This invention relates to a buoyant electric cable and more particularly to such a cable which is used for towing apparatus through water with the cable submerged or partly submerged. In offshore seismic survey work such cables are streamed behind a towing vessel with geophones or other detecting devices attached to the cables at intervals. Buoyancy has been obtained in various ways, but in most cases the assembly is such that considerable labor and time is required to pay out the assembly from the towing vessel and also to retrieve the assembly. One cable of this type is shown in Flint U.S. Pat. No. 3,272,910 dated Sept. 13, 1966, but this cable is relatively complicated and difficult to manufacture.

In some cases it is also desirable to change the buoyancy of the cable, depending upon conditions. A typical cable for this purpose is shown in Miller U.S. Pat. No. 3,375,324 dated Mar. 26, 1968. This cable is also relatively difficult and expensive to make.

These and other cables of which I have knowledge can only be used with one particular type of system so that it is necessary to manufacture a large number of different types of cable, thus increasing the cost.

It is therefore an object of my invention to provide an electric cable which is of smaller diameter and lighter weight than those cables of which I have knowledge.

Another object is to provide such a cable in which geophones or the like may be incorporated directly into the cable structure without increasing the cable diameter or disturbing its hydro-dynamic properties.

A still further object is to provide such a cable which is so constructed that it can incorporate additional components to satisfy various types of conditions and systems without increasing the cable diameter.

These and other objects will be more apparent after referring to the following specification and attached drawing, in which:

The single Figure is a cross sectional view of the cable of my invention.

Referring more particularly to the drawing, reference numeral 2 indicates an elongated hollow member forming the main component of my cable which may be used alone or with additional internal components. The member 2 includes a core member 4 which is shown as a pipe. While a strength member or other type of core may be substituted for the tube 4 it is preferred to use a tube in order to obtain all the benefits of my invention. The material of which the pipe 4 is made is not critical, but it is preferred to make it of a plastic or synthetic resin such as polyethylene because of its light weight. A plurality of elements are stranded around the pipe 4. Some of the elements are tubes 6 which are made of any suitable material such as nylon or other synthetic resin. The remaining elements are electric conductors 8 which in one particular cable consist of five pairs of copper strands 10, each conductor being covered with insulation. The strands 10, instead of being stranded together, are preferably bunched together and held assembled by means of a circumferential binder 12 which may be made of Mylar to prevent the strands from separating during the stranding operation. A binder 14 which may also be made of Mylar surrounds the stranded assembly. A water blocking compound 16 may fill the voids around the pipes 6 and conductors 8 between the pipe 4 and binder 14. The compound 16 may be a calking composition, such as a mixture of asbestos fibers and a binder. A foam jacket 18 is then extruded around the stranded assembly. While the material of which the jacket 18 is made is not critical, it must be lighter than water. For example, it may have a specific gravity of between 0.55 and 0.70. For this reason it is preferably made of a foamed plastic or synthetic resin such as polyethylene. In order to keep the diameter of the cable as small as possible the jacket 18 is preferably eccentric to the axis of the pipe 4 so that it is of different thickness around its periphery with its maximum thickness being diametrically opposite its minimum thickness. Thus, a geophone or other sensing device 20 may be embedded in the maximum thickness portion of the jacket. More than one such sensing device will be located along the length of the cable. The geophone 20 is connected to a pair of the strands 10 by means of leads 22. An outer protective jacket 24 is preferably extruded over the jacket 18. The particular material here is also not critical, but again it is preferred that it be made of a plastic or synthetic resin such as polyethylene. In order to identify the maximum thickness portion, a mark, such as a groove 25, is provided in the jacket 24. When used with a system such as shown in the Miller Patent a pipe 26 is inserted within the pipe 4 and a strength member 28 is inserted within the pipe 26. The pipe 26 may be made of any suitable light weight material and is preferably of the same material as pipe 4. The strength member 28 is preferably a 3 x 19 torque balanced rope covered with a plastic such as polyvinyl chloride. The outer diameter of pipe 26 is substantially less than the inner diameter of tube 4 so as to provide a space 30 therebetween. The outer diameter of strength member 28 is substantially less than the inner diameter of pipe 26 so as to provide a space 32 therebetween. The tubes 6 are adapted to receive a fluid lighter than water so that the buoyancy of the cable may be varied. Ethylene glycol is one suitable liquid. Spaces 30 and 32 are also adapted to receive fluids lighter than water. For example, one of these spaces may be filled with compressed air and the other with ethylene glycol.

While one embodiment of my invention has been shown and described, it will be apparent that other adaptations and modifications may be made within the scope of the following claims.

I claim:

1. A buoyant electric cable comprising an elongated hollow member; said member including a core member, a plurality of elements of substantially equal diameters stranded around said core member in a single layer to form a stranded structure having a substantially uniform outer diameter, some of said elements being electric conductors, and the remainder of said elements being tubes, and a foamed jacket lighter than water surrounding said stranded structure.

2. A buoyant electric cable comprising an elongated hollow member; said member including a core member, a plurality of elements stranded around said core member to form a stranded structure, some of said elements being electric conductors, and the other of said elements being tubes, and a foamed jacket lighter than water surrounding said stranded structure, said foamed jacket being of different thickness around its periphery with the maximum thickness being diametrically opposite the minimum thickness.

3. A buoyant electric cable according to claim 2 including a protective outer jacket surrounding said foamed jacket.

4. A buoyant electric cable according to claim 2 in which said core member is a pipe.

5. A buoyant electric cable according to claim 4 in which said pipe is made of polyethylene and said foamed jacket is made of foamed polyethylene, and said cable including a protective outer jacket surrounding said foamed jacket.

6. A buoyant electric cable according to claim 5 including a sensing device enclosed in the maximum thickness portion of said foamed jacket.

7. A buoyant electric cable comprising an elongated hollow member; said member including a first pipe comprising a core member, a plurality of elements stranded around said core member to form a stranded structure, some of said elements being electric conductors, and the other of said elements being tubes, a foamed jacket lighter than water surrounding said stranded structure, a second pipe within said first pipe having an outside diameter less than the inside diameter of said first pipe so as to provide a space therebetween, and a strength member within said second pipe.

8. A buoyant electric cable according to claim 7 including a protective outer jacket surrounding said foamed jacket.

9. A buoyant electric cable according to claim 8 including a sensing device enclosed in said foamed jacket.

10. A buoyant electric cable according to claim 9 in which said strength member is a torque balanced steel rope encased in a jacket.

11. A buoyant electric cable according to claim 1 in which said foamed jacket is of different thickness around its periphery with the maximum thickness being diametrically opposite the minimum thickness.

12. A buoyant electric cable according to claim 11 including a sensing device enclosed in the maximum thickness portion of said foamed jacket.

* * * * *